United States Patent [19]

Terry

[11] 4,267,626
[45] May 19, 1981

[54] FIBER BED ELEMENT AND METHOD FOR MAKING THE SAME

[75] Inventor: Alvah B. Terry, St. Louis, Mo.

[73] Assignee: Monsanto Company, St. Louis, Mo.

[21] Appl. No.: 33,366

[22] Filed: Apr. 25, 1979

[51] Int. Cl.³ .............................................. B23P 15/16
[52] U.S. Cl. ............................. 29/163.5 F; 29/419 G; 55/510; 55/DIG. 5; 210/484
[58] Field of Search .............. 29/163.5 F, 419 G, 419; 113/118 A, 118 B, 118 C; 242/54.4; 55/DIG. 5, 510; 210/484

[56] References Cited

U.S. PATENT DOCUMENTS

| 813,282 | 2/1906 | Dutcher | 210/484 X |
|---|---|---|---|
| 2,019,241 | 10/1935 | Weiss | 55/510 |
| 2,314,640 | 3/1943 | Winslow et al. | 29/419 |
| 2,394,895 | 12/1946 | Burhans | 29/419 |
| 2,501,652 | 3/1950 | Barrickman | 29/419 X |
| 2,540,272 | 2/1951 | Malmstrom et al. | 29/419 X |
| 2,554,748 | 5/1951 | Lewis et al. | 210/484 |
| 2,626,057 | 1/1953 | Clabaugh | 29/163.5 F |
| 3,026,610 | 3/1962 | Wakefield | 29/419 X |
| 3,562,895 | 2/1971 | Niebergall et al. | 29/419 |
| 4,187,136 | 2/1980 | Nostrand | 29/163.5 F |

Primary Examiner—Nicholas P. Godici
Assistant Examiner—V. K. Rising
Attorney, Agent, or Firm—Lawrence L. Limpus

[57] ABSTRACT

A fiber bed element and the method of making the same wherein a roving of glass fibers is fed into the annulus formed by a pair of concentric cylindrical screens, the screens being rotated as the roving is fed. A packing force is applied to the roving to compact the roving to a predetermined density between the screens, the packing force being applied in a direction generally parallel to the axis of the screens such that the roving is compacted in an axial direction with each turn of the roving being sandwiched between adjacent turns. This fiber bed element is useful for removing aerosols or mists from gases.

10 Claims, 3 Drawing Figures

FIBER BED ELEMENT AND METHOD FOR MAKING THE SAME

BACKGROUND OF THE INVENTION a. Field of the Invention

This invention relates to fiber bed elements and methods for making the same.

b. Description of the Prior Art

It is known to make a fiber bed element by packing randomly distributed glass fibers between two concentric screens, the elements being used to remove aerosols from a gas stream. The disadvantages of this process are that too much time and labor is required to form the element and substantial care must be taken to insure that the fibers are evenly distributed around the periphery of the fiber bed. An uneven distribution of the fibers results in a lack of a uniform fiber density in the fiber bed. If fiber density is not uniform, more fiber must be used in order to insure that all parts of the element are sufficiently thick to avoid channeling and the resulting lowered efficiency. Thicker elements require greater amounts of energy to force the gas through the element.

It is also known to make a fiber bed by winding mats made from glass fibers around a tubular screen. In order to obtain a desired fiber density in such a fiber bed, it is necessary to wrap the mat under tension to compact the mat in a radial direction. Unfortunately, the application of sufficient tension to the mat to achieve the desired fiber density tends to pull the mat apart, especially when the mat is made from staple fibers.

The process of the present invention produces a fiber bed element having a very high uniformity of fiber density throughout the element.

SUMMARY OF THE INVENTION

A fiber bed element for removing aerosols from gas streams and the method of making the same wherein a roving of glass fibers is packed in successive turns in the annulus formed by a pair of concentric foraminous screens in such a manner that each turn is positioned between adjacent turns, the screens being rotated as the roving is fed in. A packing force is applied to the roving in a direction generally parallel to the axis of the screens to axially compact the roving to a density of 80 to 320 Kg per cubic meter.

DETAILED DESCRIPTION OF THE INVENTION

Figure 1:
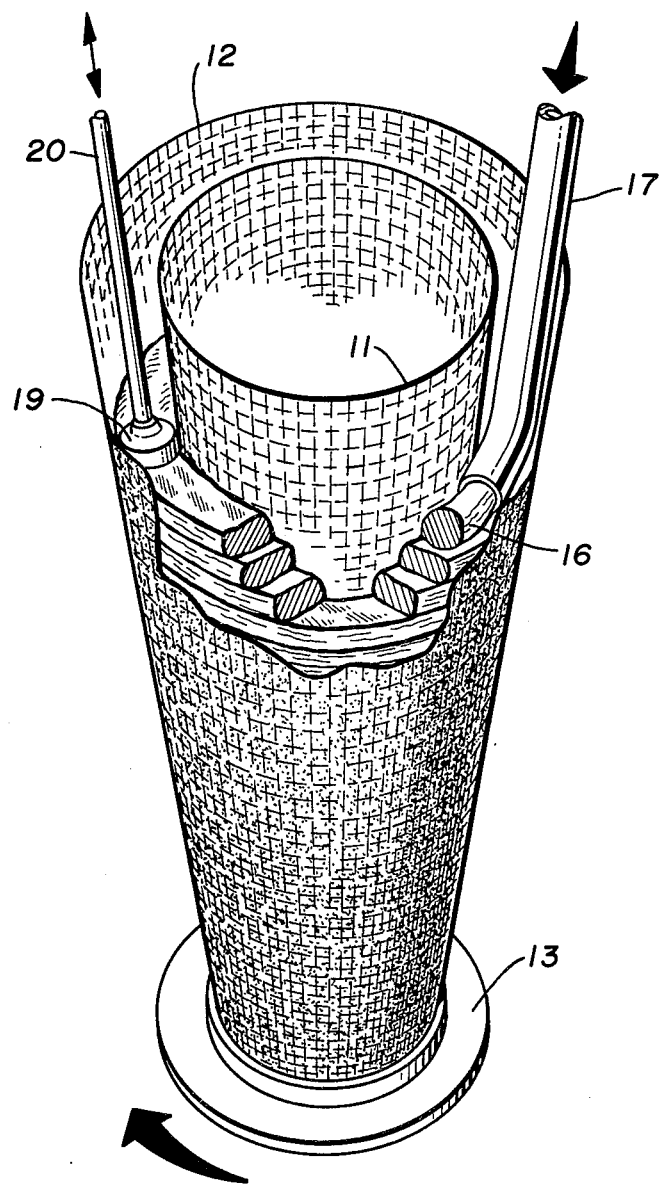
FIG. 1 of the drawing is an enlarged perspective view of the fiber bed element of the present invention with portions cut away to show the manner in which the roving of glass fibers is axially packed into the annulus formed by a pair of concentric foraminous screens.

Referring now in detail to the drawing there is shown a pair of concentric screens 11 and 12 which are preferably made from a wire mesh of a conventional type. In the manufacture of the fiber bed element, the screens 11 and 12 are positioned on a rotating turnable 13 and a roving 16 of glass fibers in staple form, fed from a tube 17, is laid into the annulus formed by the two screens. The roving 16 is packed to a desired packing density by a reciprocating packing element or foot 19 mounted on the end of a rod 20. The construction and operation of the tube 17 and the packing element 19 and rod 20 will be described hereinbelow.

It can readily be seen from FIG. 1 that the packing of the roving flattens the roving to fill the space between the screens 11 and 12. The packing of the roving into this annulus is such that the wire mesh screens 11 and 12 prevent the packed roving from any significant expansion after it has been packed to the desired density.

Figure 2:
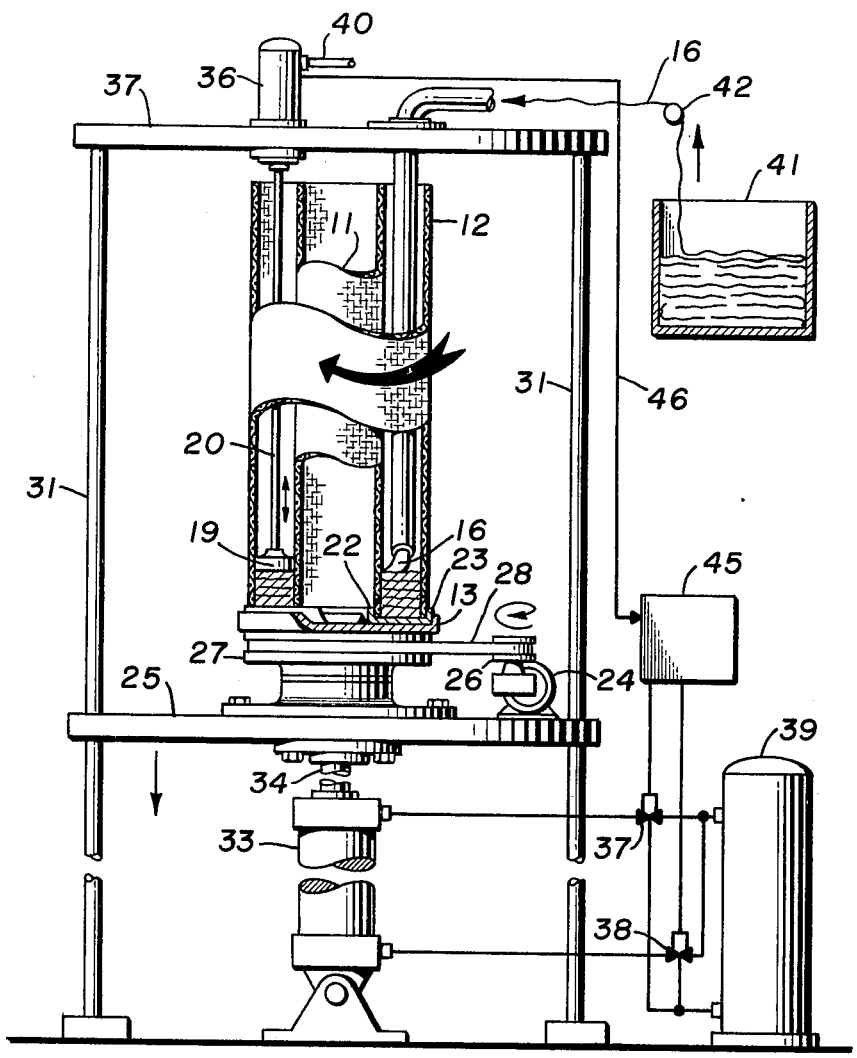
FIG. 2 is a side view of apparatus which may be used to make the fiber bed element of this invention.

FIG. 2 shows apparatus which may be used for making the fiber bed element of this invention. The turntable 13 which supports the screens 11 and 12 is provided with concentric flanges 22 and 23 which hold the screens 11 and 12 in a concentric arrangement as the table 13 is rotated. The table 13 is rotatably mounted on a movable platform 25 and is driven at a desired speed by a combination motor and speed reduction drive unit 24 which acts through pulleys 26 and 27 connected by a belt 28, the drive unit 24 being mounted on the platform 25. The platform 25 is slidably mounted on guide rods 31 in such a manner that the platform 23 can be moved vertically up or down to raise or lower the screens 11 and 12 as the screens are being rotated.

A cylinder 33 positioned below the platform 25 is connected to the platform 25 by a rod 34 for moving the platform 25 up or down along the guide rods 31. The cylinder 33 is connected through valves 37 and 38 to a source 39 of fluid under pressure.

The rod 20 is connected to the piston (not shown) of a fluid-actuated hammer 36 mounted on a stationary platform 37, the hammer 36 being supplied with a suitable fluid, such as compressed air, through an inlet line 40. Hammers of this type are well known.

The tube 17 which feeds the tow 16 into the annulus formed by the screens 11 and 12 is secured to the platform 37 and receives the roving from a container 41 positioned adjacent to the platform 37, the roving 16 being fed over an air bearing 42. The lower end of the tube 17 is curved, as best shown in FIG. 1, to feed the roving into the annulus formed by the screens 11 and 12. The weight of the roving in the tube 17, in addition to a slight tension applied by rotating screens, moves the roving from the container 41 through the tube 17 into position to be packed.

In order to control the density to which the roving is packed in the annulus formed by screens 11 and 12, a control unit 45 of a well known, commercially available, type is used. This unit senses the fluid pressure in the hammer 36 through a line 46 connected to the hammer and provides an output signal when this pressure exceeds a predetermined value. If the screens 11 and 12 are not moved downward as the roving 16 is fed in and packed, the increasing amount of roving in the annulus of the screens will cause the packing pressure to increase to an undesirable value. To prevent this, the screens are intermittently moved downward. When the packing force has increased to a predetermined value, as evidenced by pressure in the hammer 36, the control unit 45 will actuate the valves 37 and 38 to cause the platform 25 to move downward to keep the packing force within desired limits. Because the platform 25 moves downward only in response to the increased packing pressure and the roving feed rate is constant, a very uniform packing density of the roving in the annulus formed by the screens 11 and 12 can be achieved.

In operation of the apparatus, the drive unit 24 rotates the screens 11 and 12 at a relatively slow speed as the roving 16 is fed into the annulus formed by the screens. The hammer 36 reciprocates the packing foot 19 at a high reciprocation rate to pack the roving into the annulus formed by the screens. Inasmuch as the foot 19 is reciprocated at a high rate and the screens 11 and 12 are turned at a relatively low speed, there is no need for a provision for a lateral movement of the foot 19. A very slight flexing of the rod 20 is sufficient to take into the account the movement of the screens 11 and 12.

When the packing force exceeds a predetermined value, as evidenced by pressure in the hammer 36, the control unit 45 actuates the valves 37 and 38 to lower the platform 25 to maintain the packing or tamping force within desired limits. This is continued until the annulus formed by the screens 11 and 12 is completely filled with the packed roving, at which time the completed fiber bed element, indicated by reference numeral 10, is removed from the apparatus.

Since the roving 16 is not fed into the annulus under any significant tension, but is laid into the annulus between the screens under very little tension, no breaking of the roving occurs. The desired fiber density can readily be achieved without applying tension to the roving 16, since the packing of the roving is done in an axial direction.

Most frequently this fiber bed element will be used to remove liquid droplets or a mist of some liquid from a stream of gas. One example of such a use is the collection of sulfuric acid mist in an acid manufacturing process. Mist droplets which contact a fiber in passing through the fiber bed element are captured. The moving gas stream urges the droplets to the downstream side of the element, where the droplets drain down the element under the influence of gravity to a collection point.

This fiber bed element can also be used for recovering aerosols which are in solid form and which are capable of being dissolved by a suitable solvent, such as water. In this operation, the solvent may be applied as a mist in the gas stream at a point upstream of the fiber bed element or may be applied directly to the fiber bed element to irrigate the element and remove the solid aerosols by dissolving them and carrying them downward along the outer surface of the fiber bed element for collection.

Figure 3:
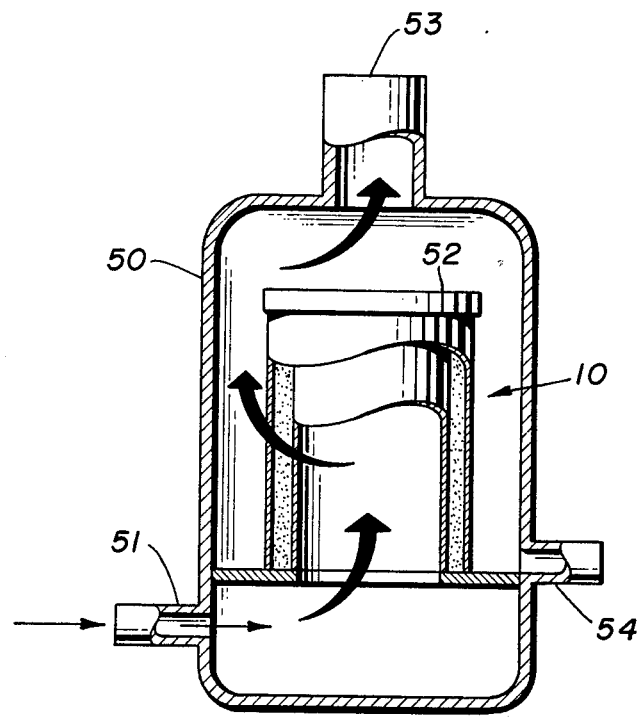
FIG. 3 shows the apparatus with which the fiber bed element of this invention may be used for removing aerosols from gases.

In operation, the element is mounted in an enclosure 50 (FIG. 3) having an inlet 51 at the bottom thereof for the entrance of a gas to be treated. The gas stream entering the enclosure 50 enters the element through one end thereof and passes through the element in a radial direction, the upper end of the element being provided with a cap 52 to prevent gases from passing directly through the central opening in the element. The treated gas exits from the enclosure 50 through an outlet opening 53. The liquid particles captured by the element drain down the outer surface of the element and are withdrawn from the enclosure 50 through an outlet opening 54.

The roving 16 is preferably composed of glass fibers in staple form, the fibers having a mean diameter in the range of 5 to 50 microns. One skilled in the art can readily determine the diameter of glass fibers by known methods. For example, one method is given in ASTM D 578-61. Preferably, the fibers have a mean diameter in the range of 5 to 15 microns. The preferred glass roving is axially packed to a density of 80 to 320 Kg per cubic meter and, preferably to a density of 130 to 210 Kg per cubic meter.

The fibers should not absorb the collected liquid to any significant extent. Suitable fiber materials include metals such as stainless steel, titanium, etc., polymeric materials such as polyesters, nylons, polyvinyl chloride, fluorocarbons, polyalkylenes, ceramics and glass. Glass fibers are preferred because of their resistance to chemical attack. The fibers should not be excessively stiff or brittle. Brittleness and stiffness of a given fiber material can usually be reduced by reducing the diameter of the fibers. It is to be understood that fiber characteristics and packing densities are selected such that the element is non-matting and mechanically stable.

I claim:

1. The method of making a fiber bed element, comprising:
   a. feeding a roving of fibers into the annulus formed by a pair of concentric foraminous screens while rotating said screens, and
   b. applying a packing force to the roving to compact said roving to a density of 80 to 320 Kg per cubic meter, said packing force being applied in a direction generally parallel to the axis of the screens so that the roving is compacted in an axial direction.

2. The method of claim 1 wherein the roving is fed into said annulus in successive turns in such a manner that each turn is compacted between adjacent turns.

3. The method of claim 1 wherein said roving is fed into said annulus at one location relative to the screens and said packing force is applied at another location circumferentionally spaced from said one location.

4. The method of claim 3 wherein the roving is made of glass fibers.

5. The method of claim 4 wherein the glass fibers have a mean diameter of 5 to 50 microns.

6. The method of claim 5 wherein the roving is packed to a density of 130 to 210 Kg per cubic meter.

7. A fiber bed element for removing aerosols from gas streams comprising:
   a. a pair of concentric foraminous screens, and
   b. a roving of fibers packed in successive turns in the annulus formed by the screens in such a manner that said turns are positioned in a side-by-side relationship, said roving being compacted axially to a density of 80 to 320 Kg per cubic meter.

8. The element of claim 7 wherein the roving is made of glass fibers.

9. The element of claim 8 wherein the glass fibers have a mean diameter of 5 to 50 microns.

10. The element of claim 9 wherein the roving is packed to a density of 130 to 210 Kg per cubic meter.

* * * * *